United States Patent [19]

Brunton

[11] Patent Number: 4,984,719
[45] Date of Patent: Jan. 15, 1991

[54] SHOT DISPENSER
[75] Inventor: John S. Brunton, Auckland, New Zealand
[73] Assignee: Illinois Tool Works, Inc., Glenview, Ill.
[21] Appl. No.: 335,871
[22] Filed: Apr. 10, 1989
[51] Int. Cl.$^5$ .......................... G01F 11/26; B67D 3/00
[52] U.S. Cl. .................... 222/454; 222/482; 137/513.5
[58] Field of Search ................ 222/21, 481, 482, 450, 222/454, 456; 137/513.5

[56] References Cited
U.S. PATENT DOCUMENTS

| 252,519 | 1/1882 | Righter | 222/454 |
|---|---|---|---|
| 2,645,388 | 7/1953 | Hester | 222/454 |
| 3,233,797 | 2/1966 | Conry | 222/477 |
| 3,321,113 | 5/1967 | Conry | 222/477 |
| 3,468,337 | 9/1969 | Smirl | 137/513.5 |
| 3,861,415 | 1/1975 | Larsen | 137/513.5 |
| 3,926,375 | 12/1975 | Reeder et al. | 137/513.5 |
| 4,030,520 | 6/1977 | Sands | 137/513.5 |
| 4,407,435 | 10/1983 | Harman | 222/481 |
| 4,674,904 | 6/1987 | Buck | 137/513.5 |

FOREIGN PATENT DOCUMENTS

| 668338 | 2/1966 | Belgium | 222/454 |
|---|---|---|---|
| 3522807 | 1/1986 | Fed. Rep. of Germany | 222/454 |
| 210450 | 3/1925 | United Kingdom | 222/454 |

Primary Examiner—H. Grant Skaggs
Assistant Examiner—Steven Reiss
Attorney, Agent, or Firm—Schwartz & Weinrieb

[57] ABSTRACT

A shot dispenser for dispensing a controlled volume of liquid from a bottle includes a base cap assembly having at least one bleed slot. The bleed slot is essentially temper-proof since it is formed within the interior of the base cap assembly and is provided for accurately controlling the speed at which a dispensing valve ball is moved toward its valve seat so as to in turn regulate the amount of liquid to be dispensed.

10 Claims, 1 Drawing Sheet

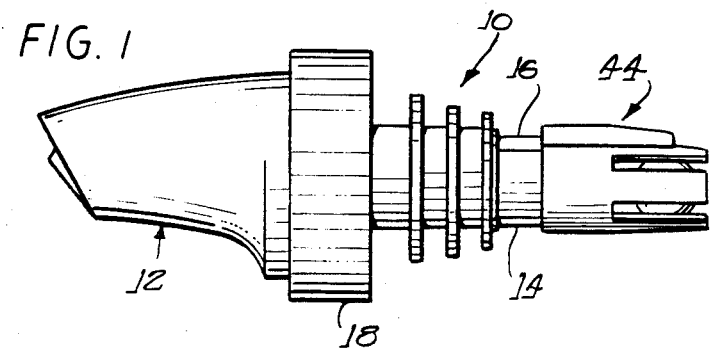
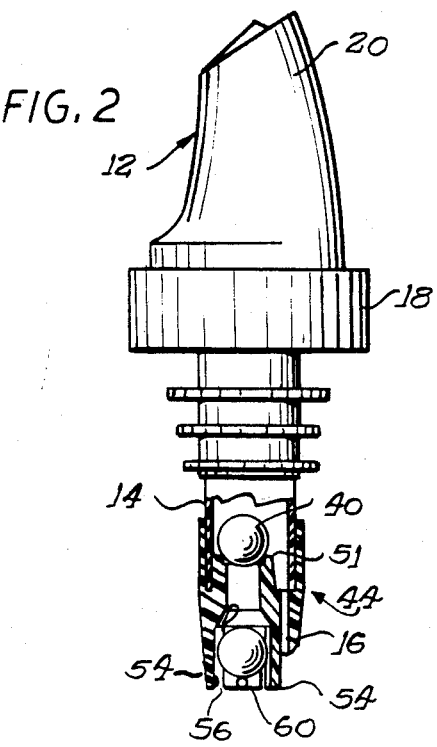
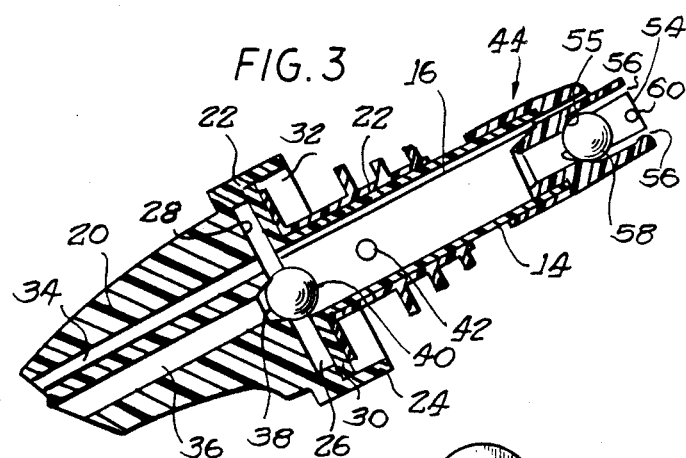
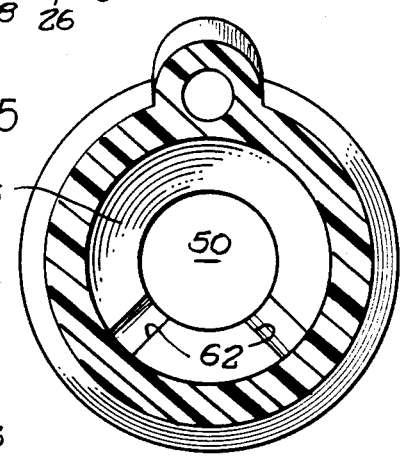
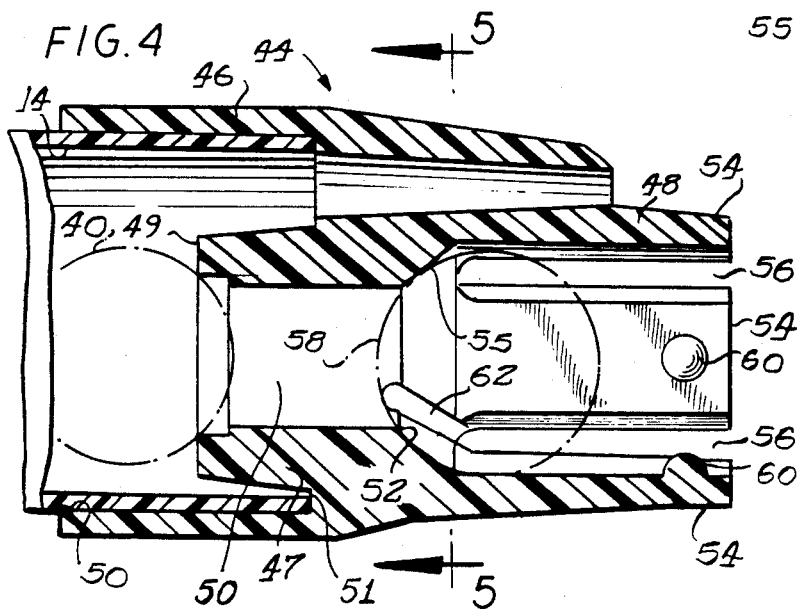

4,984,719

SHOT DISPENSER

FIELD OF THE INVENTION

This invention relates generally to pouring devices and more particularly, it relates to an improved shot dispenser for dispensing a controlled volume of liquid from a bottle which includes a tamper-proof bleed slot for accurately controlling the amount of liquid to be dispensed.

BACKGROUND OF THE INVENTION

In U.S. Pat. No. 3,321,113 issued on May 23, 1967, to Charles R. Conry and entitled "Adjustable Controlled Volume Liquid Pouring Device," there is described and illustrated a measuring pourer for dispensing liquid from a bottle in a predetermined quantity for each pouring operation. As shown in FIGS. 2-4, the pourer 10 includes a first ball 38 slidably disposed within a pouring tube 14 and a first valve seat 37 disposed at the upper end of the pouring tube against which the first ball 38 is adapted to seat so as to prevent further passage of liquid from the pourer when it is disposed in the tilted pouring position. A liquid control opening 54 is formed within the sidewall of the pouring tube 14 adjacent its lower end for controlling the amount of liquid flowing from the pourer during each pouring operation.

A ball cage 46 is mounted upon the lower end of the pouring tube. A second ball 58 is loosely confined within the ball cage and is adapted to seat against a second valve seat 56 when the pourer is tilted to the pouring position so as to close off the lower end of the pouring tube 14 and leave only the control opening 54 in communication with the exterior of the first ball 38 and the lower end of the pouring tube. In operation, when the pourer 10 is tilted the first ball 38 begins to move from the lower end of the pouring tube 14 toward the valve seat 37 at the upper end thereof. Simultaneously, the second ball 58 within the ball cage 46 immediately moves its seating position against the valve seat 56. In this manner, the rapidity of movement of the first ball 38 through the pouring tube 14 is controlled by means of the size of the control opening 54. Thus, the amount of liquid dispensed during each tilting operation of the pourer is dependent upon the accurate size of the opening 54.

It has been generally known that the control opening 54 in this prior art pourer being visible in the sidewall of the pouring tube is susceptible to frequent tampering. In particular, many times a round object is forced into the control opening thus enlarging the same. As a result, the larger opening causes the first ball 38 to move quicker toward the seat 37 and less liquid is dispensed during each tilting operation of the pourer. Furthermore, another problem that has been encountered during the manufacturing of the prior art pourer is the difficulty of controlling the tolerance of the opening, which adversely affects its accuracy.

It would therefore be desirable to provide an improved shot dispenser which includes a tamper-proof bleed slot for accurately controlling the amount of liquid to be dispensed. The shot dispenser of the present invention is much easier and simpler to manufacture by injection molding since the bleed slot is less susceptible to damage than the prior art control opening. The present invention represents an improvement over the '113 patent discussed above.

OBJECTS OF THE INVENTION

Accordingly, it is a general object of the present invention to provide an improved shot dispenser having a tamper-proof bleed slot which is relatively simple and economical to manufacture and assemble.

It is another object of the present invention to provide an improved shot dispenser which includes a base cap assembly having a bleed slot formed within its interior, thereby rendering the same to be tamper-proof.

It is another object of the present invention to provide an improved shot dispenser which is much easier and simpler to manufacture by injection molding.

SUMMARY OF THE INVENTION

In accordance with these aims and objectives, the present invention is concerned with the provision of an improved shot dispenser for dispensing a controlled volume of liquid from a bottle which includes a spout having vent and dispensing passageways. Vent and dispensing tubes are arranged to be in communication with the respective vent and dispensing passageways. A first ball is movably disposed within the dispensing tube. A first valve seat is disposed adjacent the upper end of the dispensing tube against which the first ball is adapted to seat so as to prevent further dispensing of the liquid when the dispenser is disposed in a tilted pouring position.

A base cap assembly is formed upon the lower ends of the vent and dispensing tubes. The base cap assembly consists of a sleeve portion, a tubular extension portion and a ball cage portion. The sleeve portion is joined to one end of the tubular extension portion by means of a first annular shoulder serving as a stop for the first ball. The cage portion is joined to the other end of the tubular extension portion by means of a second annular shoulder serving as a second valve seat. The second valve seat is disposed adjacent the upper end of the cage portion. At least one bleed slot is formed within the second annular shoulder. A second ball is disposed within the cage portion and is adapted to seat against the second annular shoulder when the dispenser is disposed in the pouring position so as to substantially close off the lower end of the dispensing tube, but leaving the bleed slot in communication with the lower end of the dispensing tube and the first ball.

BRIEF DESCRIPTION OF THE DRAWINGS

These and other objects and advantages of the present invention will become more fully apparent from the following detailed description when read in conjunction with the accompanying drawings with like reference numerals indicating corresponding parts throughout the several views, and wherein:

FIG. 1 is side elevational view of a shot dispenser, constructed in accordance with the principles of the present invention;

FIG. 2 is a partly fragmentary, side elevational view of the shot dispenser of FIG. 1 in the upright, non-pouring position;

FIG. 3 is a cross-sectional view of the shot dispenser in the tilted pouring position;

FIG. 4 is an enlarged cross-sectional view of the lower end portion of the shot dispenser of FIG. 3; and FIG. 5 is a cross-sectional view taken along the lines 5—5 of FIG. 4.

DESCRIPTION OF THE PREFERRED EMBODIMENT

Referring now in detail to the drawings and in particular to FIG. 1, there is shown a shot dispenser 10 of the present invention for dispensing a controlled volume of liquid, particularly alcoholic beverages from bottles. The shot dispenser 10 is comprised of a spout 12, a dispensing tube 14, and a vent tube 16. A stopper 18 formed of a flexible material is adapted to fit snugly within the neck of a bottle (not shown) so as to secure the dispenser 10 to the top of the bottle. In use, the dispensing tube 14 and vent tube 16 extend into the interior of the bottle. The spout 12 of the dispenser is arranged to extend outside of the mouth of the bottle.

As can be seen from FIGS. 2 and 3, the spout 12 includes an upper dispensing section 20 and a lower base section 22. The base section 22 includes a downwardly extending annular flange 24. Within the base section 22, there is provided a hollow chamber 26 formed by the inside surface 28 and one side of a circular plate member 30. The other side of the plate member 30 is used to form an outer recess 32 with the flange 24. The upper end of the vent tube 16 communicates directly with the hollow chamber 26. The dispensing tube 14 extends through the chamber 26 into the upper dispensing section 20.

The dispensing section 20 has a vent passageway 34 and a dispensing passageway 36 which are both in communication with the chamber 26 at their lower ends. The vent passageway 34 is disposed so as to be axially offset from the vent tube 36 so as to prevent the undesired loss of liquid through the vent passage during a pouring operation. The upper end of dispensing tube 14 is in direct communication and thus axially aligned with the dispensing passageway 36 through means of the chamber 26.

At the junction of dispensing tube 14 and dispensing passageway 36, there is provided a ball valve seat 38 against which a ball 40 sealingly seats when the dispenser 10 is tilted to the pouring position as depicted in FIG. 3. Adjacent the upper end of the dispensing tube 14 there is provided at least one or more holes 42 defined within its sidewall which allows for the passage of liquid from the bottle by means of the dispensing tube 14 so that the liquid can be dispensed from the spout 12 by means of the dispensing passageway 36.

Referring now to FIG. 4 of the drawings, it will be noted that the lower ends of the dispensing and vent tubes 14, 16 are provided with a base cap assembly 44. The base cap assembly includes a sleeve portion 46, a tubular extension portion 47, and a ball cage portion 48. The sleeve portion 46 is adapted to be secured over the lower ends of the vent and dispensing tubes and has a central opening 50 which is axially aligned with the dispensing tube 14. The sleeve portion is joined to one end of the tubular extension portion 47 by means of an annular shoulder 51. The annular shoulder 51 serving as a stop abuts against the lower end of the dispensing tube and the upper end of extension portion 47 is provided with a valve seat 49 which is made only as large as is necessary so as to prevent the ball 40 from falling out of the dispensing tube when the dispenser is disposed in the upright position.

A ball valve seat 52 consisting of an annular flange 55 is formed between the other end of the tubular extension portion 47 and the upper end of the cage portion 48. The cage portion 48 is defined by means of four axially projecting members 54, each being separated from the other ones by means of U-shaped slits or gaps 56. A ball 58 is loosely confined within the cage portion 48 and is adapted to seat against the valve seat 52 when the dispenser is tilted to the pouring position of FIG. 3. The inside surface of each of the projecting members 54 is provided with a bead or bump 60 so as to prevent the ball 58 from falling out of the cage portion when the dispenser is disposed in the non-pouring upright position of FIG. 2. In this upright position, the ball 58 falls rapidly from the valve seat 52 to the bottom of the cage portion 48 so as to uncover the central opening 50 and allow quick draining of the liquid from the dispensing tube 14.

Unlike the prior art pourers which have a small liquid measuring control opening of a generally circular configuration and which is defined within the sidewall of the pouring tube, the improved spout dispenser of the present invention includes at least one or more elongated bleed slots 62 formed within the annular shoulder 55. As can best be seen from FIG. 5, each of the bleed slots 62 is sloped inwardly and extends between a corresponding one of the U-shaped slits 56 and the central opening 50 defined within the lower end of the dispensing tube 14 for controlling the amount of liquid to be dispensed.

In operation, as the dispenser is tilted to the pouring position, the ball 40 will begin to move from the lower end of the dispensing tube 14 toward the valve seat 38 at the upper end thereof. Simultaneously, the ball 58 within the cage portion 48 will move immediately so as to seat against the valve seat 52 which substantially closes the central opening 50. However, the bleed slots 62 are left unblocked, thereby providing free and open passages from the cage portion 48 to the lower end of the dispensing tube 14 and the ball 40. In this manner, the rate of movement or descent of the ball 40 through the dispensing tube 14 is controlled by means of the size and number of the slots 62, thereby regulating the amount of liquid to be dispensed. In particular, the larger the slot or the larger the number of slots of the same size, the more quickly the ball 40 moves toward the valve seat 38 along the dispensing tube and thus less liquid will be dispensed for each tilting operation of the dispenser. On the other hand, the smaller the slot or the smaller the number of slots will cause the ball 40 to move less quickly toward the valve seat 38 and therefore more liquid will be dispensed for each tilting operation of the pourer.

While the elongated bleed slots perform the same function as the liquid measuring control opening (circular hole) of the prior art pourers, the bleed slots have the advantage of being easier to manufacture with more precise tolerances than the circular holes. Furthermore, since the circular hole was generally visible within the sidewall of the pouring tube, it was more susceptible to tampering. Since the slots 62 are formed within the annular shoulder 55 and are located inside of the cage portion 48, they are not very conspicuous and are thus essentially tamper-proof.

From the foregoing detailed description, it can thus be seen that the present invention provides an improved shot dispenser for dispensing a controlled volume of liquid from a bottle which includes a bleed slot for accurately controlling the amount of liquid to be dispensed. This is achieved by means of the provision of at least one or more bleed slots which are formed within a base cap assembly connected to the lower ends of the vent and dispensing tubes.

While there has been illustrated and described what is at present considered to be a preferred embodiment of the present invention, it will be understood by those skilled in the art that various changes and modifications may be made, and equivalents may be substituted for elements thereof without departing from the true scope of the invention. In addition, many modifications may be made to adapt a particular situation or material to the teachings of the invention without departing from the central scope thereof. Therefore, it is intended that this invention not be limited to the particular embodiment disclosed as the best mode contemplated for carrying out the invention, but that the invention will include all embodiments falling within the scope of the appended claims.

What is claimed is:

1. A shot dispenser for dispensing a controlled volume of liquid from a bottle, comprising:
   a spout having vent and dispensing passageways defined therein;
   vent and dispensing tubes being respectively disposed in communication with said vent and dispensing passageways;
   a first ball movably disposed within said dispensing tube;
   a first valve seat disposed adjacent to a dispensing end of said dispensing tube against which said first ball is adapted to seat so as to prevent further dispensing of liquid when said dispenser is disposed in a tilted pouring position;
   ball cage means mounted upon an interior end of said dispensing tube such that a first end thereof disposed toward said first valve seat defines a stop for said first ball when said dispenser is disposed upright in a non-dispensing position, a second end of said ball cage means includes means for retaining a second ball within said ball cage means, and means intermediate said first and second ends of said ball cage means defining a second valve seat for said second ball and
   at least one bleed slot defined within said second valve seat for predeterminedly controlling the fluid flow rate of said liquid through said second valve seat such that said predetermined fluid flow rate, in turn, controls the speed at which said first ball moves within said dispensing tube from said stop toward said first valve seat, once said second ball has seated against said second valve seat when the dispenser is disposed in said pouring position so as to substantially close off an interior end of said dispensing tube yet leave said at least one bleed slot in communication with said interior end of said dispensing tube and said first ball so as to control said speed of movement of said first ball within said dispensing tube toward said first valve seat.

2. A shot dispenser as claimed in claim 1, wherein said cage means comprises a plurality of projecting members separated by U-shaped slits.

3. A shot dispenser as claimed in claim 2, wherein said bleed slot extends between one of the U-shaped slits and the interior end of said dispensing tube.

4. A shot dispenser as claimed in claim 2, wherein each of said projecting members is formed with a bead on its inside surface so as to prevent said second ball from falling out of said cage means when the dispenser is in the upright position.

5. A shot dispenser as claimed in claim 1 wherein said bleed slot is of an elongated configuration.

6. A shot dispenser for dispensing a controlled volume of liquid from a bottle, comprising:
   a spout having vent and dispensing passageways defined therein;
   vent and dispensing tubes being respectively disposed in communication with said vent and dispensing passageways;
   a first ball movably disposed within said dispensing tube;
   a first valve seat disposed adjacent to a dispensing end of said dispensing tube against which said first ball is adapted to seat so as to prevent further dispensing of liquid when said dispenser is disposed in a tilted pouring position;
   ball cage means mounted upon an interior end of said dispensing tube such that a first end thereof disposed toward said first valve seat defines a stop for said first ball when said dispenser is disposed upright in a non-dispensing position, a second end of said ball cage means includes means for retaining a second ball within said ball cage means, and means intermediate said first and second ends of said ball cage means defining a second valve seat for said second ball; and
   a plurality of bleed slots defined within said second valve seat for predeterminedly controlling the fluid flow rate of said liquid through said second valve seat such that said predetermined fluid flow rate, in turn, controls the speed at which said first ball moves within said dispensing tube from said stop toward said first valve seat, once said second ball has seated against said second valve seat when said dispenser is disposed in said pouring position so as to substantially close off an interior end of said dispensing tube yet leave said plurality of bleed slots in communication with said interior end of said dispensing tube and said first ball so as to control said speed of movement of said first ball within said dispensing tube from said stop toward said first valve seat.

7. A shot dispenser as claimed in claim 6, wherein said cage means comprises a plurality of projecting members separated by U-shaped slits.

8. A shot dispenser as claimed in claim 7, wherein each of said plurality of bleed slots extends between a corresponding one of the U-shaped slits and the interior end of said dispensing tube.

9. A shot dispenser as claimed in claim 7, wherein each of said projecting members is formed with a bead on its inside surface so as to prevent said second ball from falling out of said cage means when the dispenser is in the upright position.

10. A shot dispenser as claimed in claim 6, wherein each of said plurality of bleed slots is of an elongated configuration.

* * * * *